Patented Sept. 10, 1935

2,013,825

UNITED STATES PATENT OFFICE 2,013,825

CELLULOSE MIXED ESTER COATINGS

Charles R. Fordyce, Rochester, N. Y., and James D. Coleman, Jr., Columbus, Ohio, assignors to Eastman Kodak Company, Rochester, N. Y., a corporation of New York No Drawing. Application May 21, 1932,
Serial No. 612,854

9 Claims. (Cl. 91—70)

This invention relates to objects coated with cellulose mixed organic esters. One object of our invention is to provide objects coated with flexible, adherent coatings of cellulose mixed organic esters. Another object is to provide a process for coating objects with flexible, adherent films of cellulose mixed organic esters without the necessity of providing for the evaporation of a solvent from the cellulose ester coatings.

Films of cellulose esters, such as cellulose nitrate or cellulose acetate, have been used as protective coatings for numerous purposes, such as for electrical insulation, water-proofing, grease-proofing, etc. Such coatings have usually been applied by the use of fairly dilute solutions of the cellulose esters, such solutions being liquid at room temperatures, and giving films by evaporation of the solvents. In certain cases, such, for instance, as in the coating of wire, it is desirable to coat an object with a film of cellulose ester without the use of a volatile solvent, so that no period of drying or curing is necessary in the production of the product.

We have discovered that mixed organic esters of cellulose containing an acid radical of more than seven carbon atoms, such, for instance as cellulose acetate-stearate, cellulose acetate-propionate-stearate, cellulose butyrate-stearate, cellulose acetate-laurate, cellulose propionate-laurate, etc., may be mixed with vegetable oils, such for instance as castor oil, linseed oil, tung oil, etc., or other high-boiling organic softeners, such, for instance, as the monobutyl ether of ethylene glycol, methoxyethyl phthalate, etc., to give plastic products which are liquid at temperatures of 100° C. or above, and which, upon cooling, form protective films which solidify immediately upon cooling. Such plastic products may be used to produce protective coatings on objects such as wire, for instance, by drawing the wire, etc. through the liquid plastic at an elevated temperature, and then directly through an orifice of suitable size to give to the coating the desired thickness. Wire coated in this manner cools rapidly in the air at room temperature, and can be rolled up immediately without injury to the coated surface. The coating thus formed has properties similar to those of a coating formed by depositing the cellulose ester from solution in a volatile solvent.

The lower mixed esters of cellulose, such as cellulose acetate-propionate or cellulose acetate-butyrate, are of little value for such an operation as described above, because in order to obtain a flowable solution at sufficiently low temperatures, such a large percentage of organic softener would be required that the coating therefrom, upon cooling, would be too soft to be of value. On the other hand, a cellulose acetate-stearate containing about 35% stearyl radical melts at about 160° C., and upon addition of a small amount of an oil, or of a high-boiling softener, the mass becomes flowable at temperatures considerably below the melting point of the cellulose acetate-stearate, and solidifies readily upon cooling. Cellulose mixed esters containing acid radicals of five to seven carbon atoms, such as cellulose acetate-caproate, when mixed with softeners, give coatings which are extremely soft and easily disfigured. This property makes such compounds unsuitable for use in our process. The compounds which are useful in our process are cellulose mixed esters containing, for each twenty-four carbon atoms of the cellulose radical, at least one acid radical of eight or more carbon atoms.

We shall now give several examples of the method of carrying out our invention.

*Example 1.*—A liquid plastic material is prepared by heating a mixture of approximately 87 parts by weight of cellulose acetate-stearate, containing approximately 35% stearyl, and about 40 parts by weight of the monobutyl ether of ethylene glycol to 100° C. with good stirring. A copper wire is passed through this liquid plastic, then directly through an orifice slightly larger in diameter than the wire. The coated wire cools rapidly in the air, and can be rolled up immediately without the coating cracking or coming loose from the wire.

*Example 2.*—Two parts by weight of cellulose acetate-stearate containing 35% stearyl radical is heated for a short time, with stirring, with one part by weight of castor oil, to about 150–160° C., until a homogeneous mixture is obtained. The mixture, after cooling to about 125° C., may be used for coating in the manner described in Example 1.

*Example 3.*—Two parts by weight of cellulose propionate-stearate containing 50% stearyl radical is heated, with stirring, with one part by weight of methoxyethyl phthalate, to about 150° C., until a homogeneous mixture is obtained. The mixture, after cooling to about 110–115° C., may be used for coating as in Example 1.

*Example 4.*—Two parts by weight of cellulose acetate-stearate containing 35% stearyl radical is heated, with stirring, with one part by weight of methoxyethyl phthalate, to about 150° C., until a homogeneous mixture is obtained. The mixture, after cooling to about 120° C., may be used for coating as in Example 1. The coatings obtained in this case are tougher than those obtained in Example 2.

*Example 5.*—Four parts by weight of cellulose acetate-stearate containing 35% stearyl radical is heated, with stirring, with one part by weight of methoxyethyl phthalate, to about 160° C., until a homogeneous mixture is obtained. The mixture, after cooling to about 150° C., may be used for coating as in Example 1.

*Example 6.*—Two parts by weight of cellulose acetate-stearate containing 35% stearyl radical is heated, with stirring, with one part by weight of softener, to about 160° C., until a homogeneous mixture is obtained, which after slight cooling may be used for coating as in Example 1. Examples of the softeners and coating temperatures which may be used are as follows:

| Softener | Optimum temperature for coating |
| --- | --- |
|  | ° C. |
| Ethyl phthalate | 135–140 |
| n-Butyl sulfone | 125–130 |
| Benzyl benzoate | 130–135 |

It will be understood that the above examples are given merely by way of illustration, and that we are not limited thereby except as indicated in the appended claims. In place of the cellulose esters mentioned, we may use other cellulose mixed organic esters containing the radical of an aliphatic acid of more than seven carbon atoms, such for instance, as cellulose acetate-laurate, cellulose acetate-propionate-stearate, cellulose-propionate-laurate, etc. In place of the softeners mentioned we may use other plasticizers or vegetable oils which are miscible with the cellulose mixed ester used. The temperatures may be varied considerably, it being necessary only that the plastic mixture be liquid at the temperature used and that the temperature be not high enough to bring about appreciable evaporation of the softener. The viscosity of the mixture varies somewhat with the temperature; an optimum temperature for coating each mixture will readily be determined by those skilled in the art. The proportions which we have given are merely illustrative, and may be varied considerably, depending somewhat upon the cellulose ester, the softener used and fluidity desired. It is necessary only that the plastic mixture be liquid at the temperature used, and that it be sufficiently viscous to adhere to the wire and solidify rapidly. These proportions can be readily determined by anyone skilled in the art.

While we have described the coating of wire by our novel process, it will be obvious to those skilled in the art that our process is useful in the production of many other types of coated products. For instance, threads, rods, tubes, sheets, and similar objects may be coated by passing them through our liquid plastics and then through suitable orifices or thickness gauging devices. Textiles and the like may be coated with our liquid plastics by spreading the plastics upon them with a knife or "doctor blade" such as is commonly used in coating textiles.

What we claim as our invention and desire to be secured by Letters Patent of the United States is:

1. A process of coating an article comprising drawing it through a hot, liquid mixture comprising, as its preponderant components, a cellulose mixed organic ester containing an aliphatic acid radical having more than seven carbon atoms and a non-volatile softener for the cellulose ester, the softener being present in smaller amount than the cellulose ester, then drawing the article through an orifice of a size and shape suitable for imparting the desired thickness to the coating, and allowing the coating to harden by cooling.

2. A process of coating an article comprising drawing it through a hot, liquid mixture comprising, as its preponderant components, a cellulose mixed organic ester containing a stearic acid radical and a non-volatile softener for the cellulose ester, the softener being present in smaller amount than the cellulose ester, then drawing the article through an orifice of a size and shape suitable for imparting the desired thickness to the coating, and allowing the coating to harden by cooling.

3. A process of coating an article comprising drawing it through a hot, liquid mixture comprising, as its preponderant components, a cellulose mixed organic ester containing a lauric acid radical and a non-volatile softener for the cellulose ester, the softener being present in smaller amount than the cellulose ester, then drawing the article through an orifice of a size and shape suitable for imparting the desired thickness to the coating, and allowing the coating to harden by cooling.

4. A process of coating an article comprising spreading upon it a hot, liquid mixture comprising, as its preponderant components, a cellulose mixed organic ester containing an aliphatic acid radical having more than seven carbon atoms and a non-volatile softener for the cellulose ester, the softener being present in smaller amount than the cellulose ester, and allowing the coating so formed to harden by cooling.

5. A process of coating a textile comprising spreading upon it a hot, liquid mixture comprising, as its preponderant components, a cellulose mixed organic ester containing an aliphatic acid radical having more than seven carbon atoms and a non-volatile softener for the cellulose ester, the softener being present in smaller amount than the cellulose ester, and allowing the coating so formed to harden by cooling.

6. Copper wire having a coating comprising, as its preponderant components, a cellulose mixed organic ester containing an aliphatic acid radical having more than seven carbon atoms, and a non-volatile softener for the cellulose ester, the softener being present in smaller amount than the cellulose ester.

7. A coating composition comprising a cellulose mixed organic ester containing an aliphatic acid radical having more than seven carbon atoms and a quantity of a non-volatile softener for the cellulose ester less than the amount of the cellulose ester and insufficient to effect solution of the cellulose ester at ordinary room temperatures, the coating composition being free from a volatile solvent of the cellulose ester.

8. A coating composition comprising a cellulose mixed organic ester containing a stearic acid radical and a quantity of a non-volatile softener for the cellulose ester less than the amount of the cellulose ester and insufficient to effect solution of the cellulose ester at ordinary room temperatures, the coating composition being free from a volatile solvent of the cellulose ester.

9. A coating composition comprising a cellulose mixed organic ester containing a lauric acid radical and a quantity of a non-volatile softener for the cellulose ester less than the amount of the cellulose ester and insufficient to effect solution of the cellulose ester at ordinary room temperatures, the coating composition being free from a volatile solvent of the cellulose ester.

CHARLES R. FORDYCE.
JAMES D. COLEMAN, JR.